United States Patent

Lewis et al.

[11] Patent Number: 5,940,552
[45] Date of Patent: Aug. 17, 1999

[54] OPTICAL SWITCH WITH MULTIPLE REFRACTIVE ELEMENTS PIVOTED INTO RESPECTIVE BINARY STATES

[75] Inventors: Warren Hale Lewis, Newport; Robert Nelson Fair, Jr., York; Terence Mason Ward, Middletown; Casey Francis Kane, Etters, all of Pa.

[73] Assignee: The Whitaker Corporation, Wilmington, Del.

[21] Appl. No.: 08/950,114

[22] Filed: Oct. 14, 1997

[51] Int. Cl.$^6$ .................................................. G02B 6/35
[52] U.S. Cl. .................................. 385/18; 385/33; 385/47
[58] Field of Search ...................... 385/18, 47, 31, 385/33, 46

[56] References Cited

U.S. PATENT DOCUMENTS

| | | | |
|---|---|---|---|
| 4,239,331 | 12/1980 | Aoyama | 350/96.2 |
| 4,304,460 | 12/1981 | Tanaka et al. | 350/96.16 |
| 4,322,126 | 3/1982 | Minowa et al. | 350/96.2 |
| 4,329,017 | 5/1982 | Kapany et al. | 350/96.15 |
| 4,479,697 | 10/1984 | Kapany et al. | 350/96.18 |
| 4,484,793 | 11/1984 | Laude | 385/22 |
| 4,932,745 | 6/1990 | Blonder | 350/96.2 |
| 5,000,534 | 3/1991 | Wantanabe | 350/96.2 |
| 5,133,030 | 7/1992 | Lee | 385/19 |
| 5,361,315 | 11/1994 | Lewis et al. | 385/16 |
| 5,621,829 | 4/1997 | Ford | 385/22 |
| 5,661,827 | 8/1997 | Lewis et al. | 385/18 |

*Primary Examiner*—John D. Lee
*Assistant Examiner*—Victoria D. Hao
*Attorney, Agent, or Firm*—Gerald K. Kita

[57] ABSTRACT

An optical switch 10 has a first waveguide I arranged in a first set, $2^N$ waveguides in a second set, and N number of successive refractive elements between ends of the waveguides and a reflector 9, wherein an output signal is coupled to any of the $2^N$ waveguides by pivoting said refractive elements to selected binary states.

5 Claims, 4 Drawing Sheets

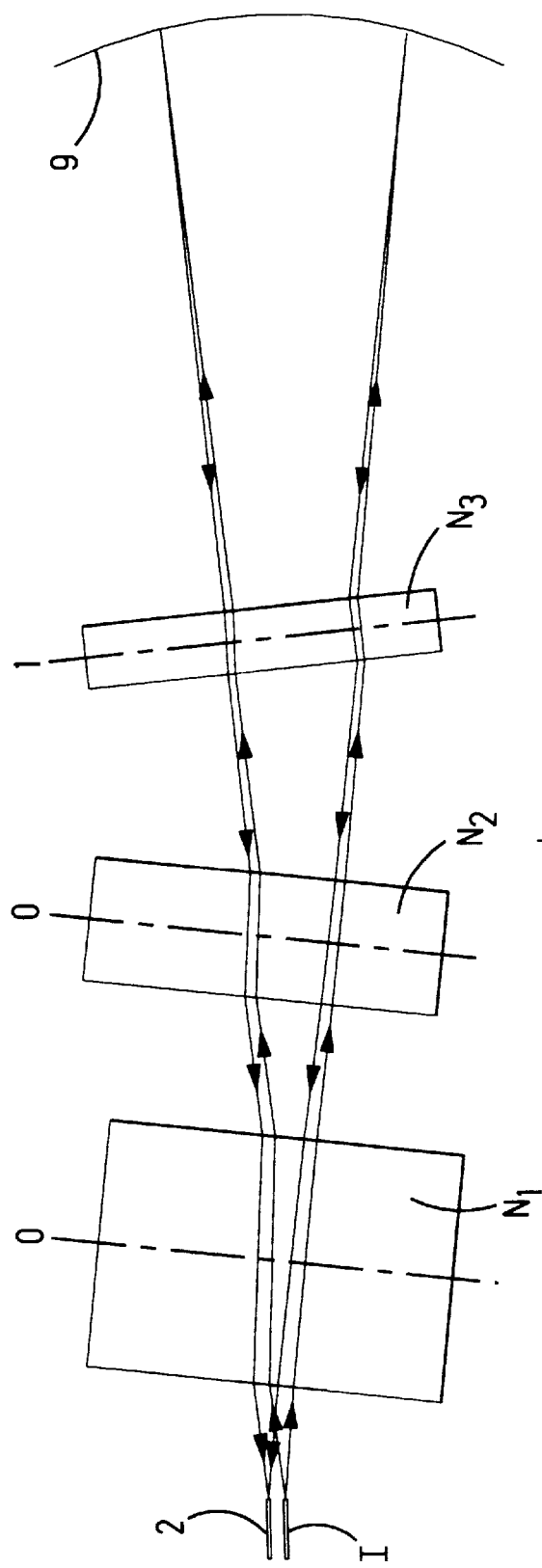
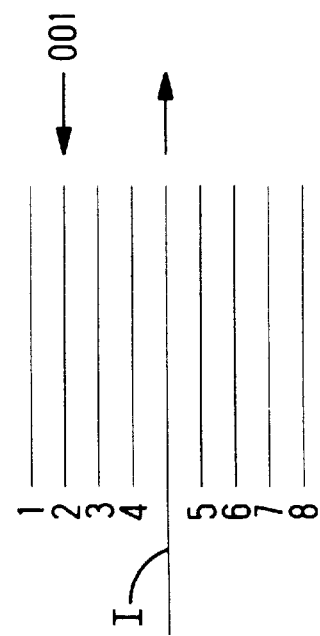

5,940,552

OPTICAL SWITCH WITH MULTIPLE REFRACTIVE ELEMENTS PIVOTED INTO RESPECTIVE BINARY STATES

FIELD OF THE INVENTION

The invention relates to an optical switch, and more particularly, to an optical switch having a fixed-position reflector and a pivoting refractive element.

BACKGROUND OF THE INVENTION

A known optical switch is disclosed in U.S. Pat. No. 5,361,315. Operation of the known optical switch will now be described. With a single refractive element in a first stationary position, an optical signal emanating from one of the optical fibers transmits through the refractive element, and upon reflection by a fixed-position reflector, transmits again through the refractive element to become transmitted into a output optical fiber. The refractive element is pivoted to a second stationary position to transmit the signal into a different output optical fiber. Thus, the optical switch couples an output signal with two selected output optical fibers by pivoting the single refractive element between two stationary positions. To modify the known switch with more than two output optical fibers, or with more than one input optical fiber, would require the single refractive element with a capability to move sequentially to an increased number of positions. Sequential movement of the refractive element would cause unacceptable delays in switch operation, and would add complexity to a mechanism for actuating the refractive element to more than two positions.

SUMMARY OF THE INVENTION

The invention relates to an optical switch having multiple refractive elements between a fixed-position reflector and an array of optical fibers. Each of the refractive elements is pivotable to no more than two stationary positions, which avoids complexity in a mechanism for actuating each refractive element. Each of the refractive elements is pivotable independently. Additionally, the refractive elements can be pivoted simultaneously, which avoids switching delays.

Embodiments of the invention will now be described by way of example with reference to the accompanying drawings, according to which:

DESCRIPTION OF THE DRAWINGS

FIG. 4 is a view similar to FIG. 1 illustrating the refractive elements in respective 0 0 1, binary states;

FIG. 5 is a view similar to FIG. 2, of an output optical signal being coupled to a different output waveguide in the second set;

DETAILED DESCRIPTION

A known optical switch is described in U.S. Pat. No. 5,361,315, the disclosure of which is hereby incorporated by reference. In the known switch, a single refractive element enables switching between two output optical fibers.

Figure 1:
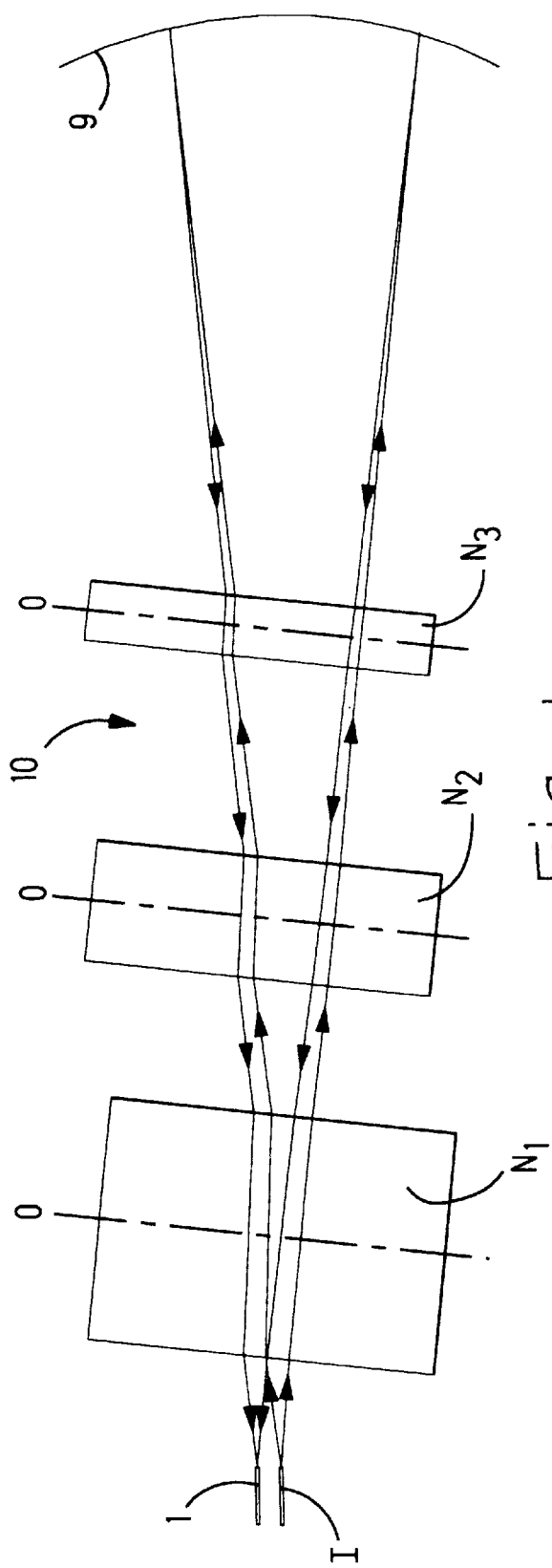
FIG. 1 is a schematic view of an optical switch having an input set of optical waveguides and a second set of output optical waveguides in front of a fixed-position reflector, and multiple refractive elements.
Figure 2:
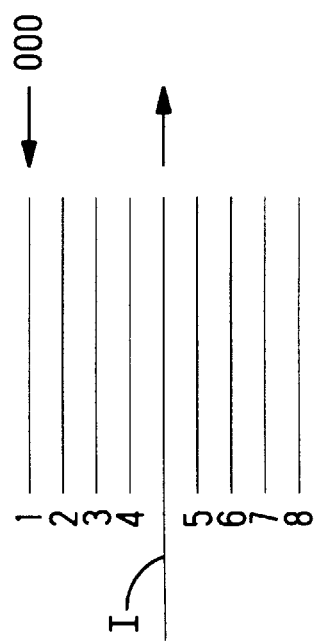
FIG. 2 is a schematic view of one of the input optical waveguides in the first set, and an output optical signal being coupled to a first of the output waveguides in the second set.

With reference to FIGS. 1 and 2, an optical switch 10, according to an embodiment of this invention, has N number of multiple refractive elements $N_1$ $N_2$ $N_3$ between a fixed-position, concave reflector 9 and ends of multiple optical fibers. The optical fibers are separable into two sets, having at least a first optical fiber I in a first set, and having $2^N$ optical fibers in a second set. An optical fiber I in the first set can be coupled to any of the $2^N$ optical fibers in the second set by pivoting N number of refractive elements to selected stationary positions. For example, the switch 10 comprises three refractive elements $N_1$ $N_2$ $N_3$ and a corresponding number of eight output optical fibers 1, 2, 3, 4, 5, 6, 7 8.

Figure 3:
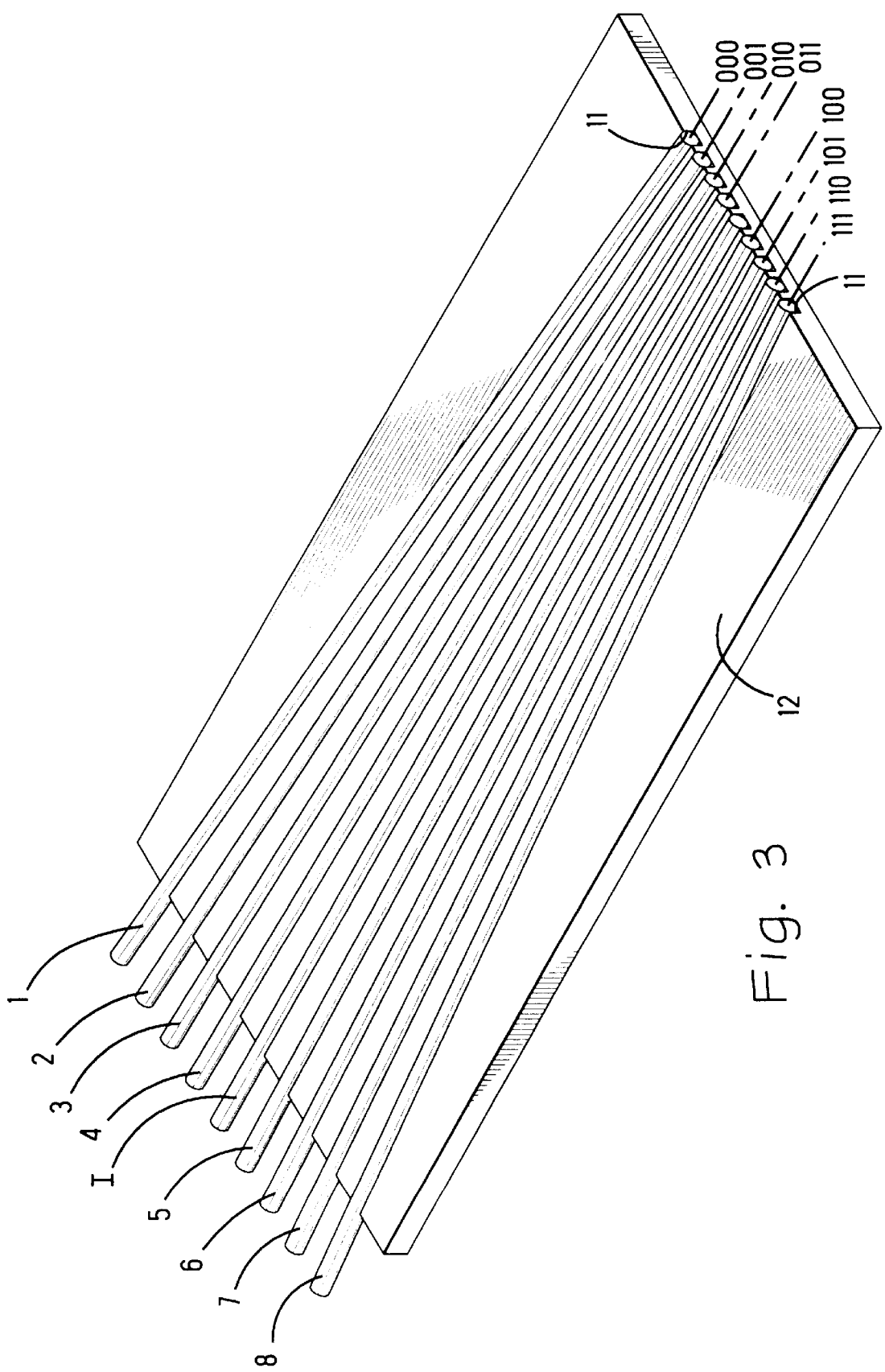
FIG. 3 is an enlarged isometric view of the optical waveguides in the form of optical fibers side by side in respective channels in a plate.

With reference to FIG. 3, the optical fiber I, is side to side with the multiple, $2^N$ output optical fibers 1, 2, 3, 4, 5, 6, 7, 8 in respective channels 11 in a plate 12, with ends of all the optical fibers pointing in front of the reflector 9.

Thus the switch 10 comprises, N refractive elements in succession, where N>1. For example, where N=3, there are eight output optical fibers and three refractive elements in succession.

An optical signal emanating from an optical fiber I in the first set transmits successively through the refractive elements $N_1$ $N_2$ $N_3$, and upon reflection by the reflector 9, again transmits successively through the refractive elements $N_1$ $N_2$ $N_3$, to become transmitted into a selected one of the output optical fibers 1, 2, 3, 4, 5, 6, 7, 8 in the second set.

Each of the refractive elements $N_1$ $N_2$ $N_3$ pivots between selected, binary states, 0 and 1, respectively. As shown in each of the FIGS. 1, 4 and 6, position 0 is relatively clockwise, and position 1 is relatively counterclockwise.

With reference to FIG. 1, all of the refractive elements $N_1$ $N_2$ $N_3$ are in respective clockwise positions corresponding to binary states, 0 0 0. The binary sum of the binary states is expressed as, 0 0 0=0. The output of the switch 10 is transmitted to a corresponding output optical fiber 1. The output optical fiber has a position=p in the array expressed as, 1+{binary sum}=p.

Thus, 1+{0}=1. An optical signal from the optical fiber I is transmitted to the output optical fiber 1.

With reference to FIG. 4, a first refractive element $N_3$ is shown as being pivoted to a counterclockwise position, such that its binary state becomes 1. The remaining, second and third refractive elements $N_1$ $N_2$ are in respective clockwise positions, and retain their respective binary states, 0 0. The binary sum of the binary states is expressed as, 0 0 1=1. The corresponding position of the output optical fiber in the array can be expressed as, 1+{1}=2. Accordingly, as shown in FIGS. 4 and 5, an optical signal from the optical fiber I is transmitted to an output optical fiber 2.

Figure 6:
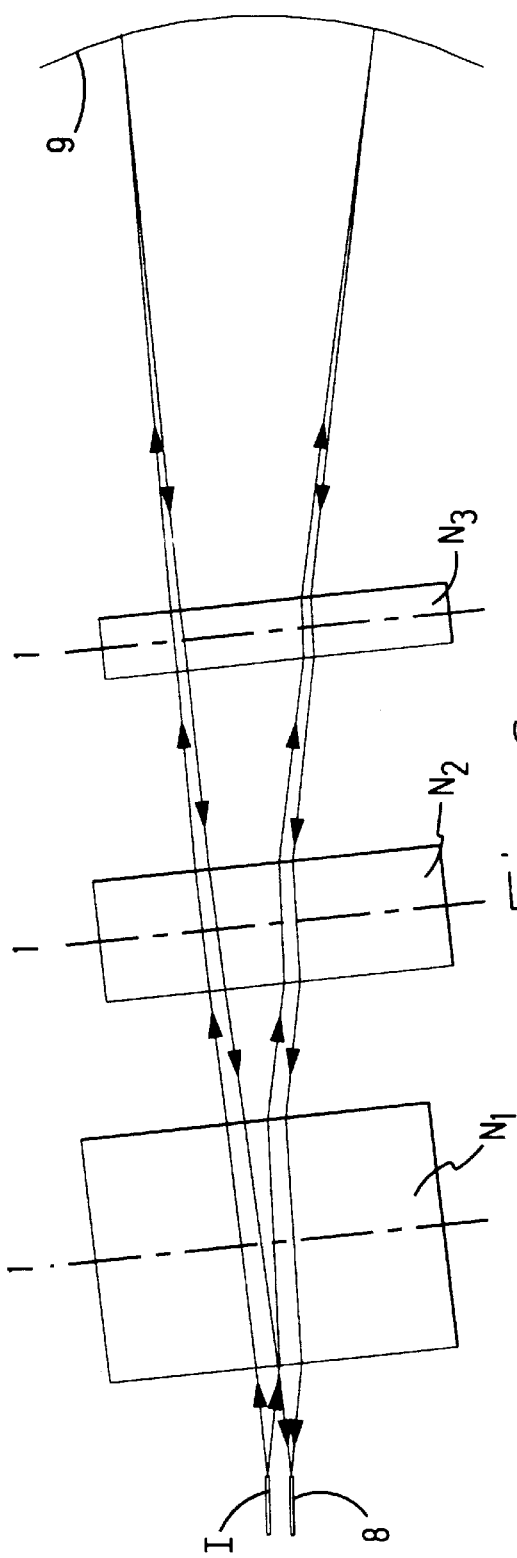
FIG. 6 is a view similar to FIG. 1 illustrating the refractive elements in respective 1 1 1, binary states.
Figure 7:
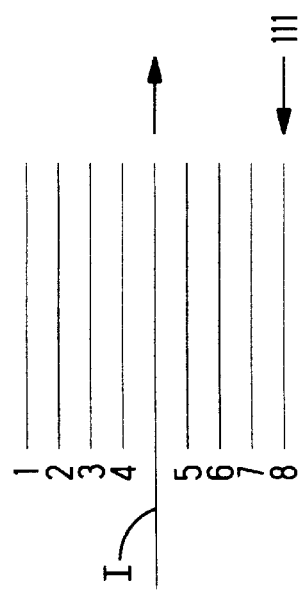
FIG. 7 is a view similar to FIG. 2, of an output optical signal being coupled to a different output waveguide in the second set.

With reference to FIG. 6, each of three refractive elements $N_1$ $N_2$ $N_3$ is shown as being pivoted to a counterclockwise position, such that its binary state becomes 1. The binary sum of the binary states is expressed as, 1 1 1=7. With reference to FIGS. 6 and 7, an optical signal from the optical fiber I is transmitted to an output optical fiber 8, p=1+{7}=8.

Thus, by pivoting the refractive elements $N_1$ $N_2$ $N_3$ first, to correspond with binary states 0 0 1, as shown in FIG. 1, and second, to correspond with binary states 1 1 1, as shown in FIG. 6, the output of the switch 10 becomes switched between the optical fibers 2 and 8. Similarly, by pivoting the refractive elements $N_1$ $N_2$ $N_3$ first, to correspond with binary states 0 0 0, as shown in FIG. 1, and second, to correspond with binary states 1 1 1, as shown in FIG. 6, the output of the switch becomes switched between the optical fibers 1 and 8. The following table provides respective binary states of the refractive elements N, corresponding to the refractive elements $N_1$ $N_2$ $N_3$, and the binary sum, and the output optical fiber corresponding to the binary states of the refractive elements.

| $N_1$ | $N_2$ | $N_3$ | Sum | p |
|---|---|---|---|---|
| 0 | 0 | 0 | 0 | 1 |
| 0 | 0 | 1 | 1 | 2 |
| 0 | 1 | 0 | 2 | 3 |
| 0 | 1 | 1 | 3 | 4 |
| 1 | 0 | 0 | 4 | 5 |
| 1 | 0 | 1 | 5 | 6 |
| 1 | 1 | 0 | 6 | 7 |
| 1 | 1 | 1 | 7 | 8 |

By modifying the switch 10, for example, to provide two refractive elements $N_1$ $N_2$, a portion of the table can be truncated to indicate the binary states of said two refractive elements $N_1$ $N_2$ as, 1 1, having a corresponding binary sum of 3, which allows switching among four output optical fibers. By modifying the switch, for example, to provide four refractive elements $N_1$ $N_2$ $N_3$ $N_4$, the table can be expanded to indicate the binary states of said four refractive elements as, 1 1 1 1, the binary sum of which is 15, which allows switching among sixteen output optical fibers.

In each embodiment of the invention, the multiple refractive elements N of two or more can be pivoted simultaneously, which means that an increase in the number of refractive elements N would avoid adding time delays in switching them. A suitable mechanism for pivoting a single refractive element to its binary states is described in U.S. patent application Ser. No. 08/686,886, filed Jul. 26, 1996, by inventors, Bernard G. Caron and Warren H. Lewis, now U.S. Pat. No. 5,719,972, the disclosure of which is incorporated by reference, hereby. In the present invention, each one of the multiple refractive elements N, described above, can be pivoted independently to its binary states by operation of a corresponding mechanism as described in the patent. Further, by operating the corresponding mechanisms simultaneously, the multiple refractive elements N can be pivoted simultaneously, which avoids increased time delays in switching.

Although preferred embodiments of the invention have been described, other embodiments and modifications of the invention are intended to be covered by the spirit and scope of the appended claims.

What is claimed is:

1. Optical switch comprising: an array of optical waveguides aligned side to side with their ends pointing in front of a fixed-position concave reflector, the waveguides being arranged in two sets, a first set having at least a first waveguide, and a second set having $2^N$ waveguides, and N number of multiple refractive elements between the ends of the waveguides and the reflector, wherein N>1, and wherein said waveguide of the first set is optically coupled to any of the $2^N$ waveguides by selectively pivoting said refractive elements substantially simultaneously to respective binary states 0 and 1, thereby avoiding added time delays in switching the N number of multiple refractive elements.

2. An optical switch as recited in claim 1 wherein, each said waveguide is an optical fiber.

3. An optical switch as recited in claim 1 wherein, each of said refractive elements pivots to respective binary states 0 and 1, and each binary sum of the binary states is in equivalence with one of the $2^N$ waveguides.

4. An optical switch comprising: an array of $2^N$ number of output optical fibers with their ends pointing in front of a fixed-position reflector, and an N number of refractive elements between a source of optical signal and the reflector, each of said refractive elements being selectively pivotable simultaneously to respective binary states 0 and 1 to switch the optical signal to a selected output optical fiber, thereby avoiding added time delays in switching the N number of multiple refractive elements.

5. An optical switch as recited in claim 4 wherein, the source of an optical signal is at least a first optical fiber side to side with said output optical fibers.

* * * * *